United States Patent [19]
Roberts et al.

[11] 3,754,115
[45] Aug. 21, 1973

[54] TUBE SHEET WELDING WITH INERT GAS PRESSURE AT THE JOINT

[75] Inventors: John G. Roberts, Thousand Oaks; Jack Weber, San Jose; Secondino P. Margherio, Van Nuys, all of Calif.

[73] Assignee: North American Rockwell Corporation, El Segundo, Calif.

[22] Filed: Mar. 20, 1972

[21] Appl. No.: 236,300

[52] U.S. Cl............. 219/125 R, 219/60 A, 219/74, 219/137
[51] Int. Cl............................................ B23k 9/12
[58] Field of Search................. 219/60 A, 60 R, 61, 219/124, 125 R, 126, 137, 74, 160, 72, 8.5

[56] References Cited
UNITED STATES PATENTS

| | | | |
|---|---|---|---|
| 2,922,870 | 1/1960 | Collins et al...................... | 219/72 X |
| 3,614,378 | 10/1971 | Goddell............................ | 219/61 X |
| 3,345,494 | 10/1967 | Apblett, Jr. et al............. | 219/125 R |
| 2,819,517 | 1/1958 | Pursell............................ | 219/137 X |
| 1,872,114 | 8/1932 | Burnish............................ | 219/61 X |
| 2,716,692 | 8/1955 | Williams et al................... | 219/61 |
| 2,716,691 | 8/1955 | Bowman........................... | 219/61 |
| 3,018,358 | 1/1962 | Schaaf, Jr........................ | 219/72 |

Primary Examiner—J. V. Truhe
Assistant Examiner—L. A. Schutzman
Attorney—L. Lee Humphries, Henry Kolin et al.

[57] ABSTRACT

A method and apparatus is disclosed to horizontally butt fusion weld a tube to a tube sheet. A chill bar surrounds the butted joint forming a chamber around the joint to contain an inert gas under pressure. An orbital type welder is inserted inside the tube adjacent the butted joint and the interior atmosphere surrounding the electrode is pressurized with a second inert gas at a pressure higher than the inert gas in the chamber surrounding the exterior of the butted joint to prevent the weld puddle from falling by gravity into the inside of the horizontally disposed tube and tube sheet during the welding operation.

7 Claims, 6 Drawing Figures

Patented Aug. 21, 1973 3,754,115

TUBE SHEET WELDING WITH INERT GAS PRESSURE AT THE JOINT

BACKGROUND OF THE INVENTION

1. Field of the Invention

Prior art methods to join tubes to tube sheets include the following. Most heat exchangers, conventional fossil fuel systems, and the like, join thin tubes to headers or tube sheets by inserting the ends of the tubes into apertures in the header or tube sheet until the ends of the tube are flush with the outer face of the header, followed by welding of the end of the tube adjacent the face of the header. An alternative method includes pressing the ends of the tube into a recessed housing, followed by fusion welding of the tubes in place exteriorly of the tubes.

In the field of nuclear reactors it is extremely important for successful operation of the reactor to achieve an absolute leak tightness of all the tubes and tube sheet joints. The foregoing prior art practices just described do not achieve a complete fusion of the tube to the tube sheet since they are welded exteriorly of the tubes. A method for joining tubes to a tube sheet which includes a butt fusion weld process is shown in an article in the *Welding Journal*, July 1960, pages 2-6, by Messrs. Rowlands and Cooksey. The butt fusion weld is accomplished from the inside of the tube, thus a complete fusion of the ends of the tube to the adjacent tube sheet stub is provided since the weld goes completely through both the tube and tube sheet stub, providing an effective joint. FIG. 10 of the article shows that the butt fusion weld is completed when the tube and tube sheet stub are oriented in a vertical direction. Gravity does not cause the molten weld puddle to drop into the interior of the tube during the fusion weld process since the orientation of the tube is in the vertical direction. However, a problem peculiar to the nuclear art arises in that the heat exchangers are lengthy, thus it becomes advantageous and practical to fabricate the heat exchangers in a substantially horizontal position. Thus, it can be seen that to fusion weld the tubes in the heat exchangers to tube sheet stubs or headers, the weld puddle formed by the welding sequence tends to fall out by gravity, thus complicating the sensitive weld sequence.

SUMMARY OF THE INVENTION

It is an object of this invention to provide a method to fusion butt weld tubes to a tube sheet on a horizontal plane.

More specifically, it is an object of this invention to fusion butt weld tubes to tube sheet stubs in a horizontal plane by providing a method and apparatus for backing the molten weld puddle during the fusion weld cycle.

The method devised includes the following. The basic components include a split assembly or chill bar fabricated from a material of, for example, copper, with clamping screws for retaining the chill bar for assembly on the workpiece, namely, the tube to the tube sheet stub or header. The copper chill bar assembly has a gas manifold with outlets to purge the outside of the workpiece and the weld nugget with an inert gas during the welding cycle. A groove in the copper chill bar provides space for the inert gas coverage and backup casting or die for the molten weld nugget. An internal plug with a measured orifice therein is inserted downstream of the weld joint to provide an internal gas pressure seal, thus providing a chamber for an inert atmosphere surrounding the welding head. An orbital type welder is inserted interiorly of the header and tube and has its welding tip or electrode directed radially outwardly adjacent the joint of the tube and the tube sheet. A source of inert gas under pressure is admitted through the orbital welder apparatus to the interior of the tube and tube sheet stub or header. The inert gas under pressure is supplied to the chamber surrounding the electrode or the orbital welder during the welding operation to provide a backup pressure for the molten weld puddle, thereby forcing the molten puddle into the backup groove or die of the copper chill bar surrounding the butted joint. Thus, it can be seen that sagging of the molten weld puddle in response to gravity is prevented and welding with the workpiece or tubes in a substantially horizontal position may be accomplished satisfactorily. The small orifice in the internal plug is provided so that as the internal inert gas under pressure enters the chamber surrounding the orbital welding electrode, it forces any gas impurities such as oxygen through the measured orifice so that a completely inert atmosphere may be provided. The interior inert gas is under higher pressure than the gas within the chamber formed by the chill bar surrounding the exterior of the butted joint so that the puddle is forced into the chill bar groove.

Therefore, an advantage over the prior art is the method in which the molten weld puddle is prevented from falling out of the joint formed by the tube and tube sheet during a sutstantially horizontal fusion weld process.

BRIEF DESCRIPTION OF THE DRAWINGS

The above noted objects and advantages of the present invention will be more fully understood upon a study of the following detailed description in conjunction with the detailed drawings in which.

DESCRIPTION OF THE PREFERRED EMBODIMENT

Figure 1:
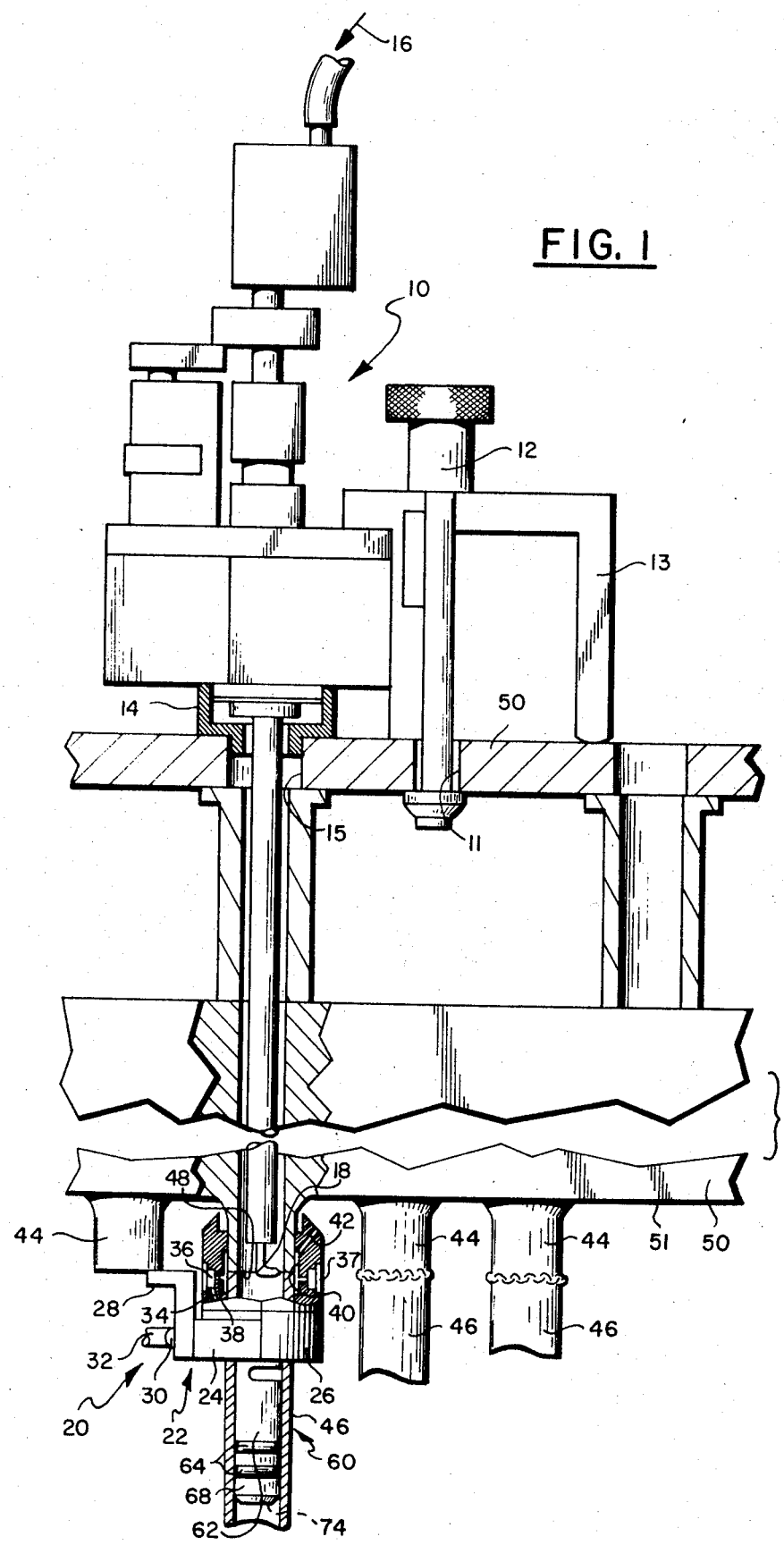
FIG. 1 is a partially cutaway plane view of the preferred embodiment of the invention illustrating a butted tube joined to a tube sheet stub with a chill bar positioned around the butted joint having an orbital welder inserted interiorly of the tube adjacent the butted joint to perform the welding operation.

Turning now to FIG. 1, the internal orbital weld fixture 10, which per se forms no part of applicants' invention, is clamped to a tube sheet 50 through aperture 11 by weld clamp 12. The orbital electrode is aligned with and directed through aperture 15, the tip of the electrode 18 lying in a plane adjacent to a joint 48 between a tube to be mated and tube sheet. Lever arm 13 of weld heat 10 acts as an alignment device to assure that the electrode 18 is coaxial with the aperture 15. The sleeve 14 of welder 10 is sealably engaged with aperture 15, thereby providing a gas-tight seal. A source of inert gas 16 is admitted through aperture 15 and guided towards the vicinity of the electrode 18.

A plurality of tube sheet stubs 44 extend from a face 51 of tube sheet 50. A plurality of tubes 46 are faced at the end to be mated to the tube sheet stubs 44 so that the tubes, when axially aligned with the stubs, are in total butt contact with one another. In order to assure alignment of the tubes with the tube sheet stubs 44 and to perform other desired functions, a chill bar generally designated as 20 is positioned over the tube and tube sheet stub. The chill bar 20 consists of a housing 22 which in the horizontal position of the weld fixture and tubes is made up of an upper housing segment 24 and a lower housing segment 26, the two segments being separable so that the clamp or chill bar may be placed over the tube stub 44 and the butted end of tube 46. Screw fasteners 30 join the two segments 24 and 26 together. An inert gas conduit 32 directs inert gas, such as argon, into an inner channel 34 which directs the inert gas to a channel 36 defined around the circumference of the segments 24 and 26. A circumferential cover plate 37 closes off the channel, forming a manifold thereby. A plurality of gas passages 38 are equidistantly spaced about the inner circumference of manifold 36 which direct argon gas radially inwardly through openings 39 towards a groove 40. The groove 40, being on the inner periphery of the housing segments 24 and 26, forms a backup groove or casting die for the molten weld puddle resultant from the welding operation. It has a depth of from 0.003 to 0.010 inch. The groove 40 encompasses the area where the end of the tube 46 mates with the face of the tube stub 44. The inlet orifices 39 communicating with gas passages 38 in segments 24 and 26 do not line up in a plane adjacent the butted joint. The orifices 39 are offset so that the molten weld puddle from the joint plane will not be forced into the gas passages thereby preventing separation of the segments 24 and 26 from the completed butt weld. The tip of the electrode 18 from the orbital welder 10 lies on a plane adjacent the butted joint 48 between the tubes 46 and tube stubs 44. The welder is axially positioned so that the tip aligns perfectly with the butted joint.

Prior to inserting or installing the orbital welder 10 through orifice 15, an internal gas plug generally designed as 60 is inserted through orifice 15 with a special tool 90 and placed within tube 46 downstream of the butted joint within the chill bar 20. A pair of expandable rubber rings 64 provides a gas-tight seal, thus providing a plug for the incoming inert gas that is fed through the orbital welder device 10 and directed to the vicinity of the welding operation, i.e., the butted joint. A measured orifice 74 in the end of plug 60 provides an escape route for the gas impurities within the tube, for example, air, etc. The inert gas forces all of the impurities through the exhaust vent 74, thus providing a pure inert atmosphere for the welding operation. The size of orifice 74 is between 0.006 inch and 0.010 inch thus the orifice is small enough to maintain a higher pressure within the interior of this tube than the pressure that is maintained surrounding the butted joint. Similar exhaust orifices 42 are provided in the chill bar 20 to vent a portion of the argon supplied to the backup groove 40 through orifice 38 from manifold 36. The plurality of vent lines 42 communicates between the backup groove 40 and the exterior of the chill bar 20. By venting the backup groove or chamber 40, it is assured that the weld puddle will be uniform within the groove 40. If the groove were not vented, there could be voids caused by trapped gas in the weld puddle being forced into the groove.

In operation, argon gas entering through the orbital welder 10 being supplied to the vicinity of the welding operation is at a higher pressure within the interior of the tube than the pressure of the argon entering conduit 32 and directed towards the chamber 36. For example, the argon is within a pressure range of from 3 CFH to 12 CFH internally, while the argon in groove 40 is within a pressure range of 1 CFH to 10 CFH. The higher pressure within and surrounding the tip of the electrode 18 assures that as the welding operation proceeds, a molten weld puddle is forced into the backup groove 40 within chill bar 20, thereby assuring that the weld puddle will not fall out of the butted seam while the workpiece is in a substantially horizontal position. The increased pressure interiorly of the welding operation forces the molten weld puddle within the backup groove or casting die 40.

Figures 2, 3:
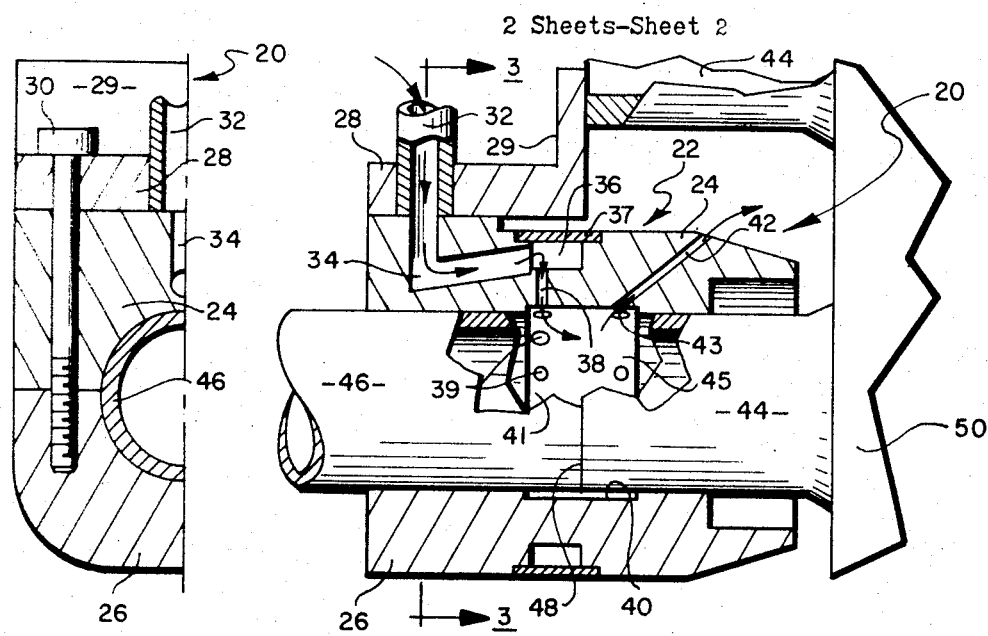
FIG. 2 is an enlarged view of the chill bar assembly surrounding the tube and tube sheet stub joint, illustrating the various apertures for injecting the inert gas both exteriorly and interiorly of the weld joint.
FIG. 3 is a view taken through lines 3—3 of FIG. 2, illustrating the clamping method utilized to join the top and bottom segments of the chill bar.

Turning now to FIGS. 2 and 3, the housing 22 of chill bar 20 is comprised of an upper housing segment 24 and a lower segment 26. The upper segment 24 has extending from the segment a conduit 32. The conduit 32 directs inert gas, such as argon, helium, etc., into an internal conduit 34 which directs the inert gas into a channel 36, the channel 36 is defined by an annular groove in both of segments 24 and 26. The groove 36 is closed off by an external band 37 which forms the manifold. A plurality of conduits 38 directs argon from the manifold 36, out through orifices 39, the orifices being equidistantly spaced around the circumference of the inner groove 40. The inner groove 40 provides an annular backup groove for the butted tube 46 and tube sheet stubs 44. The apertures 39, directing argon radially inwardly into the groove 40, are spaced at one end 41 of groove 40. Additionally, one or more exhaust ports 42 communicate between the chamber or backup groove 40 and exterior of the chill bar 20. The outlet exhaust orifices 43 leading to ports 42 are placed at the other end 45 of the groove or backup manifold 40. Orifices 39 and 43 at opposite ends of groove 40 are spaced away from the centrally positioned butted joint 48 to prevent the molten metal from being forced into the orifices 39, 43 by the increased pressure of the inert gas within the interior of the tube and tube stub. The offset apertures 39 and 43, being spaced equidistantly around the groove 40, will prevent the molten metal from flowing into these apertures assuring that the two segments 24, 26 will separate upon completion of the welding cycle.

FIG. 3 illustrates how the segments 24, 26 are connected together by bolts in screws 30. A positioning L-shaped member 28 is clamped to segment 24 of housing 22 by bolts 30. Shoulder 29 of positioning member 28 rests on the face of an adjacent tube stub 44. The shoulder 29 serves to exactly position the chill bar 20 so that groove 40 within chill bar 20 exactly positions itself over the joint 48. Thus it can be seen that the chill bar 20 is accurately located each and every time it is positioned over a mated tube and tube stub.

Figure 4:
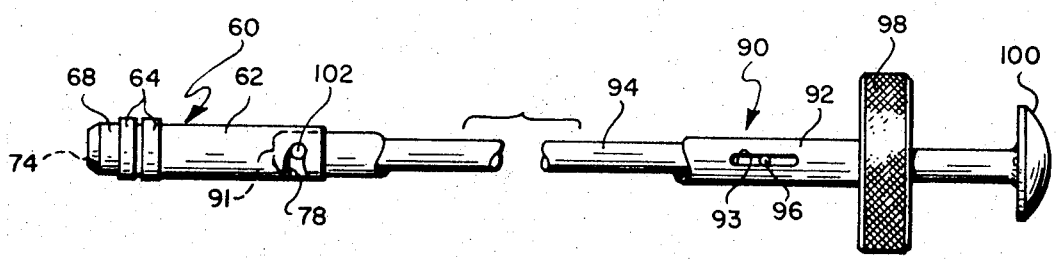
FIG. 4 is a plane view of the device used to insert the interior plug within the tube downstream of the weld joint.

Turning now to FIG. 4, there is depicted a special tool generally designated as 90 that is used to install the tube plug 60 that is positionable internally of tube 46 prior to the welding operation. The internal plug positioning tool 90 is comprised of a housing 92 which has a rod 94 slidable within the tube 92. At one end 91 of the housing 92 is affixed a pin 102. The pin 102 is engaged with the internal plug 60 through a groove 78 within the outer housing 62 of plug 60. By inserting the outer housing 62 into the groove 78 and twisting the tool 90 ninety degrees relative to the internal plug, the tool is rotated through an arc of 90° opposite to the engaging motion and slipped out of the groove 78. The rod 94 is slidable within the housing 92 within an axial distance defined by groove 93. A pin 96, connected to rod 94, extends into the groove and acts as a stop for the axially sliding rod 94 within housing 92. A disc or shoulder 98 is provided at an end of the housing 92 to provide a means to manually grasp the housing 92 relative to the rod 94. A knob 100 is positioned at an end of the internal rod 94 so that the rod may be pushed into or pulled out of housing 92.

Figure 6:
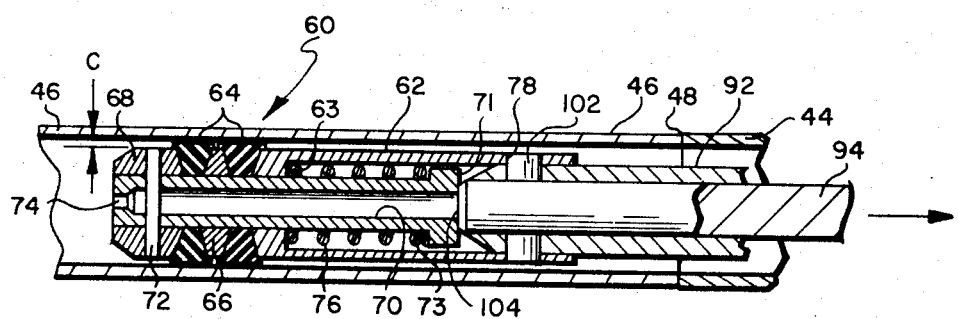
FIG. 6 is a cross-sectional view of the plug positioned in the tube downstream of the butted joint.
Figure 5:
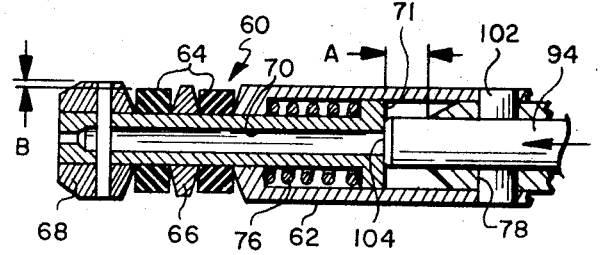
FIG. 5 is a cross-sectional view of the plug in the extended position showing the expandable rubber ring in the relaxed position thus diminishing the diameter of the rings, thereby allowing the plug to be placed in the tube.

FIG. 5 illustrates the internal plug 60 in cross-section. The internal plug 60 is comprised of outer housing 62 which defines the locking pin groove 78 for pin 102 of the insertion tool 90. Internally of the housing 62 is an inner hollow cylindrical body 70 which slides within the outer housing 62. A shoulder 63 of outer housing 62 coacts with the shoulder 73 of inner cylindrical member 70 to define a chamber which encloses an internal spring member 76. The spring 76 is biased to keep cylindrical body 70 retracted within outer housing 62. At the end of the cylindrical body 70 is a tip 68, the tip 68 is retained or connected to cylinder 70 by pin 72 (FIG. 6). Disposed between the tip 68 and the housing 62 is a pair of resilient ring members 64. The ring member 64 are separated by an annular ring 66. When the tool 90 is connected to outer housing 62, it can be seen that the end 104 of the internal rod 94 is adjacent face 71 of internal cylinder 70. Since the outer housing member 92 is engaged with housing 62 of the internal plug 60, the internal rod 94 is free to move against the cylinder 70. When the knob 100 is pressed in a distance "A" (FIG. 5), the internal cylinder 70 is biased or pushed against spring 76 which moves the internal cylinder out away from the resilient seal members 64. When this occurs, the diameters of the resilient members 64 are lessened a distance "B" so that the diameter of the resilient member 64 is less than the diameter of the internal plug housing member 62. Thus it can be seen that when the internal rod 94 is forced against the internal plug member 70, the internal plug is extended in its overall axial length, thus relieving the pressure on the resilient member 64 so that the internal plug can be easily inserted, in its extended position, with tube 64.

Turning specifically to FIG. 6, the internal plug 60 is inserted within tube 46 in its extended condition by tool 90 and when the plug is positioned accurately downstream of the butted joint 48, the pressure on knob 100 is released, allowing the spring 76 to retract the internal cylinder member 70, thereby compressing the rubber seal rings 64 a distance "C" so that the diameter then of the seal member 64 is greater than the diameter of the outer body 62, thereby locking the internal plug 60 within the tube 46. The diameter then of the seal member 64 is greater than the inside diameter of the tube 46, thereby providing a seal for the argon gas being admitted to the interior of the tube. Once the pressure is released by tool 90, the tool can be rotated ninety degrees to disengage pin 102 from housing 62, and removed from the conduit 15 in tube sheet 50. The welding fixture 10 is then clamped to the tube sheet for subsequent welding of the butted joint 48, as previously described. An orifice 74 is provided in tip 68 to vent a portion of the argon gas down the interior of tube 46, thus carrying with the vented argon any gas impurities remaining in the Vicinity of the butted joint, such as oxidizing agents and the like.

We claim:

1. An apparatus to butt fusion weld a tube abutting a tube sheet stub means when said tube and tube sheet stub means are in a substantially horizontal plane, comprising:
   a chill bar means surrounding said abutting tube and tube sheet stub means, said chill bar means having separable segments;
   manifold means defined by said segments, said manifold means communicating with an inlet conduit in one of said segments;
   weld puddle backup groove means defined by said segments of said chill bar means, said weld puddle backup groove means being adjacent said abutting tube and tube sheet stub means;
   one or more first inlet conduit means in said chill bar means communicating with said weld puddle backup groove means and said manifold means;
   one or more second exhaust conduit means in said chill bar means communicating between said weld puddle backup groove means and the atmosphere outside of said chill bar means,
   orbital welding means positioned interiorly of said tube and tube sheet stub means positioned adjacent said abutted tube and tube sheet stub joint to fuse said abutted tube and tube sheet stub means together,
   a first inert gas means connected to said first inlet conduit means whereby inert gas from said first inert gas means enters said first inlet conduit and is directed to said manifold means and passes into said first conduit means to said weld puddle backup groove means and out through said second exhaust conduit means to the atmosphere, thereby providing an inert atmosphere for a molten weld puddle; and
   a second inert gas means connected to the interior of said abutting tube and tube sheet stub means whereby inert gas under pressure from said second inert gas means enters the interior of said abutting tube and tube sheet stub means, the pressure of said inert gas from said second inert gas means being at a pressure higher than the pressure of said inert gas from said first inert gas means, thereby forcing the molten weld puddle into said weld puddle backup groove in said chill bar means.

2. The invention as set forth in claim 1 wherein said one or more first inlet conduit means communicating with said weld puddle backup groove means is offset with respect to the plane of abuttment of said tube and tube stub means so that the molten weld puddle is not forced into said one or more first inlet conduit means.

3. The invention as set forth in claim 2 wherein said one or more second exhaust conduit means communicating with said weld puddle backup groove means and the atmosphere outside of said chill bar means is offset from said abuttment plane on the opposite side of said weld puddle backup groove means from said one or more first inlet conduit means so that the molten weld puddle is not forced into said one or more second exhaust conduit means.

4. The invention as set forth in claim 1 further comprising a removable internal plug means, said plug means sealingly engaged within the interior of said tube means downstream of said chill bar means surrounding said abutting horizontally disposed tube and tube sheet stub means, said internal plug means serving to provide a seal for said second inert gas means, the inert gas under pressure from said second inert gas means being directed interiorly of said tube and tube sheet stub means, said inert gas under pressure from said second inert gas means serving to force said molten weld puddle into said weld puddle backup groove means in said chill bar means 5. The invention set forth in claim 4 wherein said internal plug means comprises an inner and outer body interfitted one with the other with a spring means interposed therebetween, said spring means acting to retract the inner body within said outer body, one or more resilient ring means positioned peripherally between radially extending shoulders on said inner and outer body, said one or more ring means, when said inner body is retracted within said outer body, being compressed so that the circumference of said ring means is greater in diameter than the inside diameter of said tube means, thereby providing a seal between said internal plug means and the interior of said tube.

6. The invention as set forth in claim 4 wherein said plug means further defines an exhaust port therethrough to pass a measured amount of inert gas through said plug means to carry out gas impurities existing interiorly of said tube and tube sheet stub means.

7. An apparatus to butt fusion weld a tube abutting a tube sheet stub means when said tube and tube sheet stub means are in a substantially horizontal plane, comprising:

a chill bar means surrounding said abutting tube and tube sheet stub means, said chill bar means having separable segments;

manifold means defined by said segments, said manifold means communicating with an inlet conduit in one of said segments;

weld puddle backup groove means defined by said segments of said chill bar means, said weld puddle backup groove means being adjacent said abutting tube and tube sheet stub means;

one or more first inlet conduit means in said chill bar means communicating with said weld puddle backup groove means and said manifold means;

one or more second exhaust conduit means in said chill bar means communicating between said weld puddle backup groove means and the atmosphere outside of said chill bar means, and orbital welding means positioned interiorly of said tube and tube sheet stub means, positioned adjacent said abutted tube and tube sheet stub means joint to fuse said abutted tube and tube sheet stub means together, an inert gas means connected to the interior of said tube and tube sheet stub means and to the interior of said weld puddle backup groove means, said inert gas means supplying inert gas under pressure, to said weld puddle backup groove means adjacent said abutting tube and tube sheet stub means and to the interior of said abutting tube and tube sheet stub means, inert gas flow splitting means serve to direct a portion of said inert gas at a higher pressure in the interior of said abutting tube and tube sheet stub means than the pressure in said backup groove means, the higher pressure in the interior of said tube and tube sheet stub means serving to force a molten weld puddle into said weld puddle backup groove means in said chill bar means.

* * * * *